United States Patent

Byrd et al.

[11] 4,079,789
[45] Mar. 21, 1978

[54] EARTH WORKING TOOL

[76] Inventors: George M. Byrd; Graham J. Byrd, both of Wynch Farm, Ashton-under-Hill, near Evesham, Worcestershire, England

[21] Appl. No.: 580,812

[22] Filed: May 27, 1975

[30] Foreign Application Priority Data

May 29, 1974  United Kingdom ............... 2373/74

[51] Int. Cl.² ................... A01B 13/14; A01B 15/02; A01B 59/043
[52] U.S. Cl. ................... 172/254; 172/439; 172/448; 172/699; 172/703; 172/704; 172/719; 172/735; 172/739; 172/740; 172/762; 172/763; 172/773
[58] Field of Search ............... 172/699, 702, 703, 704, 172/734, 735, 736, 739, 740, 762, 763, 773, 719, 439, 440, 441, 254, 448

[56] References Cited

U.S. PATENT DOCUMENTS

| 282,880 | 8/1883 | Gravitt | 172/739 X |
|---|---|---|---|
| 979,512 | 12/1910 | Kirk | 172/739 X |
| 1,012,534 | 12/1911 | Fair et al. | 172/763 |
| 1,282,661 | 10/1918 | Warren | 172/739 |
| 3,002,574 | 10/1961 | Padrick | 172/763 X |
| 3,032,903 | 5/1962 | Ede | 172/699 X |
| 3,035,360 | 5/1962 | Johnson | 172/719 X |
| 3,039,539 | 6/1962 | Thompson | 172/448 |
| 3,202,222 | 8/1965 | Norris | 172/719 X |
| 3,289,771 | 12/1966 | Bennett | 172/448 X |
| 3,398,799 | 8/1968 | Richey et al. | 172/719 |
| 3,448,813 | 6/1969 | Rogers | 172/763 X |
| 3,500,936 | 3/1970 | Vigen | 172/763 X |

FOREIGN PATENT DOCUMENTS

| 2136/26 | 6/1926 | Australia | 172/739 |
|---|---|---|---|
| 239,157 | 11/1960 | Australia | 172/441 |
| 81,265 | 7/1956 | Denmark | 172/699 |
| 71,746 | 3/1947 | Norway | 172/699 |
| 170,796 | 3/1960 | Sweden | 172/448 |

Primary Examiner—Paul E. Shapiro
Attorney, Agent, or Firm—Young & Thompson

[57] ABSTRACT

An earth-working tool has mounting means at one end for attachment of the tool to the frame of an agricultural implement, a tool blade down the forward edge of the tool and attachment means at the other end of the tool for securing a tool point. The mounting means is so arranged that the tool may be attached to the frame in such a manner that the tool blade will form a rearward angle, from the top end to the other end, in relation to a line normal to the direction of forward movement which the tool will take during use, with the result that soil tilled by the tool point will be prevented from rising to the surface by the action of the rearwardly directed tool blade. Ideally the tool may be mounted so that the tool blade will be forwardly directed, either by reversing the tool or by providing alternative mounting holes for mounting the tool to an agricultural implement.

5 Claims, 9 Drawing Figures

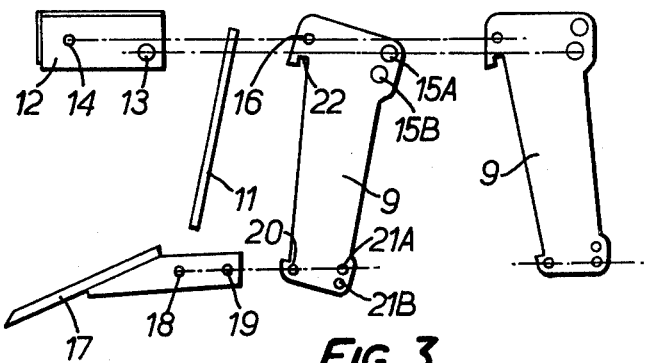
FIG.3.
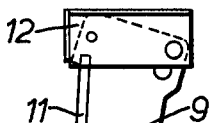
FIG.4.
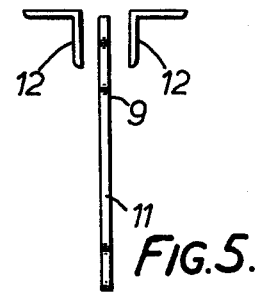
FIG.5.
FIG.6.
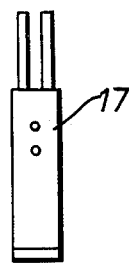
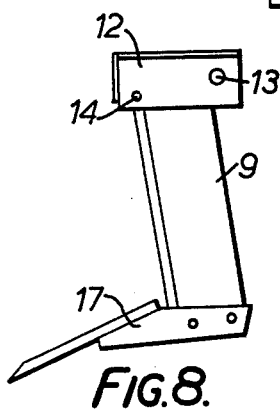
FIG.7.   FIG.8.
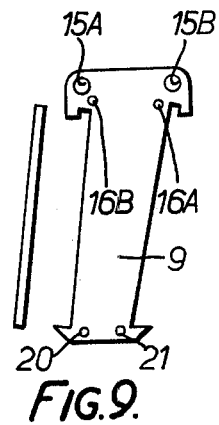
FIG.9.

EARTH WORKING TOOL

This invention is concerned with earth-working apparatus such as agricultural implements for tilling the soil.

When a field is ploughed, usually the earth to a predetermined depth is turned over so that the subsoil is brought to the surface and initially the ploughed earth has an irregular appearance and further machinery has to be employed to smooth the surface of the ground. Where the subsoil is of a heavier nature than the topsoil the final stage of smoothing the surface of the ploughed field can be difficult since the texture of the lumps on the surface will tend to vary. In such instances, therefore, it is advantageous to be able to till the subsoil without bringing it to the surface, whilst at the same time tilling the topsoil.

It is one object of this invention to provide apparatus which is capable of producing a better ploughed effect than when the soil is turned over completely.

Accordingly this invention provides an earth-working tool having mounting means at one end for attachment of the tool to the frame of an agricultural implement, a tool blade down the forward edge of the tool and attachment means at the other end of the tool for securing a tool point, the mounting means being so arranged that the tool may be attached to the frame in such a manner that the tool blade will form a rearward angle, from the top end to the other end, in relation to a line normal to the direction of forward movement which the tool will take during use.

It has been found that such a rearwardly directed tool blade enables tilling to be performed in such a manner that the tool point at the bottom end ploughs through the subsoil and, whilst the tool point tends to force the subsoil upwardly, the rearwardly angled tool blade tends to push the subsoil down again so that, generally speaking, it does not reach the surface. The upper end of the tool blade causes rupture and tilling of the topsoil so that a very desirable effect is achieved by use of the earth-working tool of this invention.

In the preferred embodiment the mounting means includes attachment plates to be secured to the frame and to locate the tool. Such mounting means may be non-adjustable or may be arranged so that the tool may alternatively be attached to the frame so that the tool blade will form a forward angle. In one such construction the tool is provided with alternative mounting holes as part of the mounting means. In an other construction the attachment means includes alternative mounting holes in the attachment plates. Ideally, in such arrangements, the tool is attached to the attachment plates about a pivot and located by a shear bolt passing through one of the alternative mounting holes. Optionally a single shear bolt hole may be provided with alternative pivot bolt holes.

Another way of arranging that the tool may alternatively form a rearward or forward angle when attached to the frame is to arrange that the tool is reversible and carries a mounting for a tool blade down both edges of the tool so that the tool blade will be directed at rearward and forward angles respectively.

Preferably the attachment means is so arranged that the tool point may be secured in alternative positions. The tool can then be so formed that the attachment means enables the tool point to be moved to form the same angle to the direction of forward movement, when the tool is attached to an alternative position so that the tool blade forms an alternative angle.

Ideally the tool blade is provided by a rotatable wear bar. This wear bar may advantageously be held in position, on the front edge of the tool, by locating means, which may include part of the mounting and/or attachment means.

The earth-working tool of this invention may be attached to an agricultural implement comprising a framework carrying the earth-working tools on at least two bars lying one behind the other in the direction of travel, and vehicle linkage points including an upper linkage point which is secured by support stays attached separately at or near both the forward and the rearward bar. Such an implement enables a number of earth-working tools to be attached but, as a result, the whole implement is of substantial weight and the double arrangement of the support stays adequately carries the weight of the implement. Ideally the implement will have three tool support bars. It is greatly preferred that the tool attachment points on the tool support bars are staggered laterally from bar to bar. This spreads the tilling effect so that there is no substantial squeezing of soil between adjacent tools.

In a preferred arrangement the top linkage is provided with two or more apertures for connection to a vehicle linkage member, the uppermost hole being displaced forwardly with respect to the lower hole(s).

The invention may be performed in various ways and preferred embodiments thereof will now be described, by way of example only, with reference to the accompanying drawings, in which:

FIG. 3 is an exploded view illustrating parts of the tool enabling the alternative fixing positions to be achieved;

FIG. 4 is a side view of the tool with all the parts interconnected;

FIG. 5 is an exploded front view of parts of the tool shown in FIG. 3;

FIG. 6 shows no alternative forms of tool point for use with the apparatus;

FIG. 7 shows a modified tool which is also capable of being set in alternative positions;

FIG. 8 is a side view of a further tool which is reversible to form different angles of attack, and FIG. 9 shows parts of the tool shown in FIG. 8.

Figure 1:
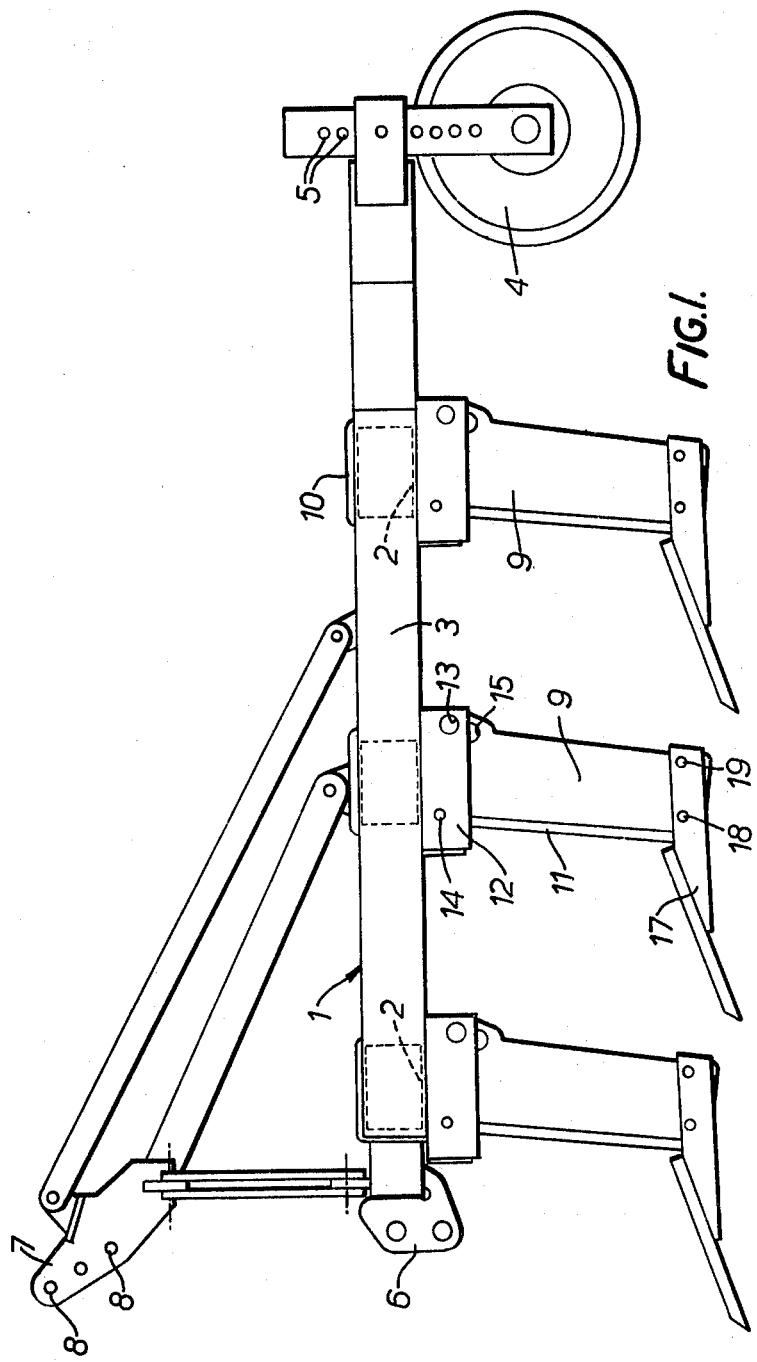
FIG. 1 is a side view of an agricultural implement constructed in accordance with this invention.

The implement shown in FIG. 1 comprises a frame 1 provided with three parallel tool bars 2 carried by side supports 3 and mounted on a pair of front wheels (optional) and a pair of rear wheels 4. The height of the rear wheels 4 is adjustable by means of the alternative mounting holes 5. The framework is provided with two bottom linkages 6 for attachment to a tractor and a top linkage 7 which is provided with three mounting holes 8 situated one above the other so that the two upper holes are staggered forwardly above the lower one. This enables the top linkage to be secured to a tractor in any one of the three positions whithout altering the length of the linkage bar to the tractor.

Earth-working tools 9 are mounted on the tool support bars 2 by means of a pair of U-bolts 10. The tools are mounted in staggered relationship along the three bars in such a way that the earth will be ploughed by the implement evenly across the width of the implement but on each tool bar the distance between adjacent tools is such that the squeezing effect on the earth passing between two tools is minimised.

Figure 2:
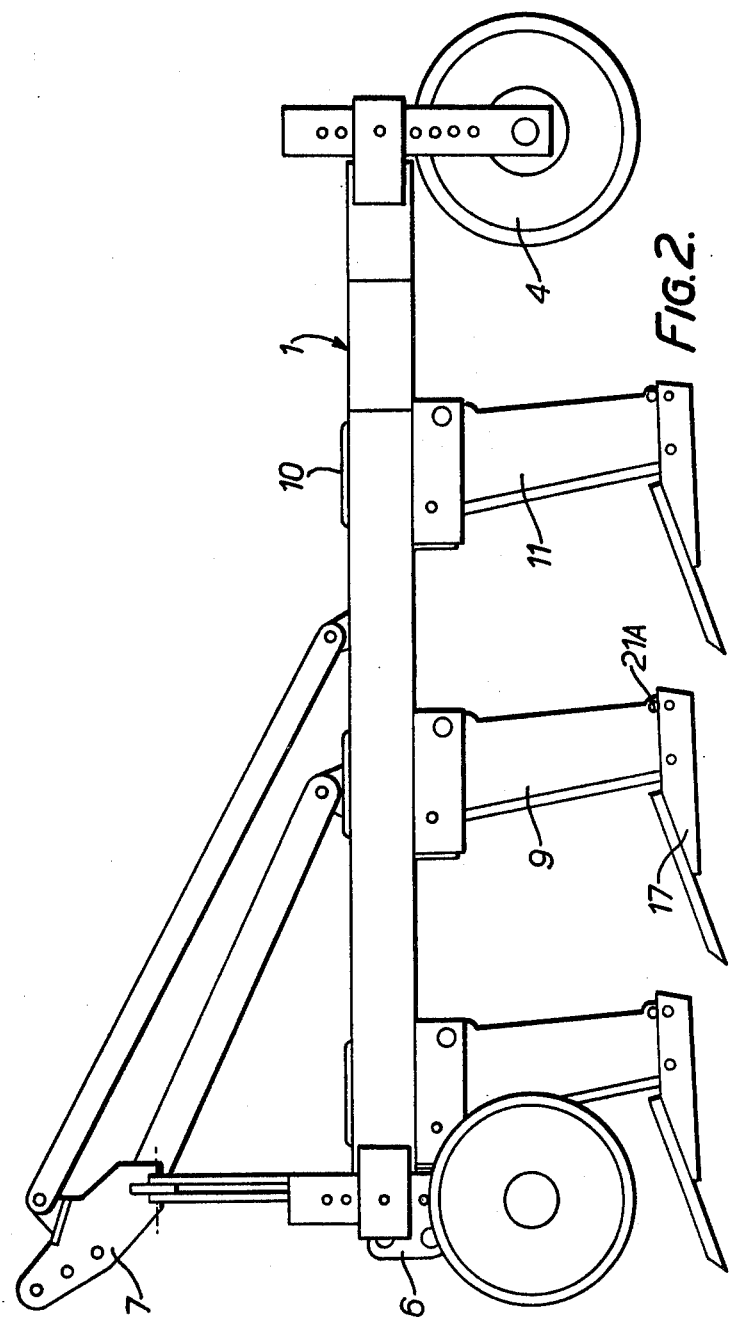
FIG. 2 is a view similar to FIG. 1 showing tools of the implement mounted in an alternative position.

As can be seen by comparing FIGS. 1 and 2, tools 9 are so constructed that they may be set in alternative positions wherein a tool blade (provided by a rotatable wear bar 11) may be set either at a forward angle as in FIG. 1 or at a rearward angle as in FIG. 2. The means of achieving this can be appreciated from a consideration of FIG. 3. Each tool 9 is secured to the U-bolts 10 by means of attachment plates 12 mounted on either side of the tool. The attachment plates 12 are formed with holes 13 for a pivot pin and holes 14 for a shear bolt. Corresponding holes 15A, 15B and 16 are provided to receive the pivot pin and shear bolt respectively. When the tool is fixed with the pivot pin passing through the hole 15A (as indicated in FIG. 3) the tool blade will be situated at a forward angle. When the pivot pin passes through the hole 15B (as indicated to the right-hand side of FIG. 3) the tool blade 11 will be situated at a rearward angle. A tool point 17 is secured by means of bolts passing through holes 18, 19 therein and the hole 20 and either of the holes 21A or 21B on the tool. By selecting the required hole 21A or 21B the tool point may be secured to the tool so that it maintains the same angle of attack into the ground regardless of the angle achieved by the tool blade 11. The tool blade 11 fits into a notch 22 near the top of the tool which prevents it from comming free from the tool when the whole apparatus is bolted together. Should the tool meet an obstacle which prevents further forward progress the force produced will cause the shear bolt passing through holes 14, 16 to break so that the tool will pivot rearwardly about the pivot pin.

FIG. 4 indicates how the tool is secured to the attachment plates 12 and the tool point 17 so that the tool blade 11 is directed forwardly. FIG. 5 shows how these parts interlink with one another. FIG. 6 shows two alternative shapes for the tool point which may be utilised for specialised purposes.

FIG. 7 illustrates an alternative method of securing the tool 9 so that it may form forward and rearward angles. In this case a single hole 15 is provided to receive the pivot pin but two holes 23 are provided for the shear bolt, thus forming the alternative mounting position. With the tool mounted as shown in FIG. 7 the tool blade 11 is set at a rearward angle. In this case the attachment plates 12 do not project on either side of the top end of the tool blade 11 and thus a locating U-shaped member 22A is secured to the tool 9 to hold the blade in position.

FIGS. 8 and 9 illustrate another form of the tool of this invention. In this case the tool 9 is reversible within the mounting provided by the attachment plates 12. Plates 12 are provided with the holes 13 and 14 and the tool 9 is provided with corresponding holes 15A, 15B and 16A, 16B respectively. When the tool is secured by the pivot pin and shear bolt passing through the holes 15A and 16A, as in FIG. 8, the tool blade will be held at a rearward angle. In the alternative position, when the pivot pin and shear bolt pass through the holes 15B and 16B, the tool blade will be held at a forward angle. In this case the tool point 17 is always secured by the holes 20, 21.

When the implement is used with the tool forming a rearward angle, as shown in FIG. 2, this enables the subsoil to be cut without bringing it to the surface so that subsequent working of the topsoil will be facilitated as it will have a substantially even texture. Furthermore, the soil moisture will not be significantly disturbed. It is believed that the soil tends to be forced upwards by the tool point 17 and down again by the rearwardly directed tool 9 so that it is channelled back into substantially its original position.

We claim:

1. Earth-working equipment comprising a pair of laterally-spaced mounting plates each having a horizontal fixing face for securing said plates to a support frame and a forward edge, an earth-working tool having two ends, a forward and a rearward edge, and a tool point, mounting means for mounting one end of said earth-working tool between said mounting plates and comprising alternative mounting hole positions in one of said earth-working tool and said mounting plates, and further mounting holes in the other of said earth-working tool and said mounting plates, such that said forward edge of said earth-working tool extends rearwardly from top to bottom when one of said alternative mounting hole positions is chosen and extends forwardly from top to bottom when the other of said alternative mounting hole positions is chosen, an earth-working tool blade having a top end and a bottom end and positioned down and generally parallel to the forward edge of said earth-working tool, and attachment means at the other end of said earth-working tool securing said tool point thereto, and incorporating alternative attachment hole positions in one of said earth-working tool and said attachment means for alternative mounting of said tool point in association with further attachment holes in the other of said earth-working tool and said attachment means, with said tool point extending forwardly and downwardly from the bottom end of said tool blade at generally the same angle to the horizontal in both the respectively forwardly and rearwardly extending positions of the forward edge of said earth-working tool.

2. Earth-working equipment according to claim 1 wherein said earth-working tool includes locating means for said tool blade and the tool blade is provided by a wear bar which is freely rotatable about its longitudinal axis to any rotary position in said locating means.

3. Earth-working equipment according to claim 1 attached to and forming part of an agricultural implement comprising a framework having at least two bars lying one behind the other in the direction of travel and vehicle linkage points including an upper linkage point and a lower linkage point, the upper linkage point defining at least two apertures for connection to a vehicle linkage member, the holes being staggered rearwardly and downwardly from the uppermost hole and wherein the apertures in the upper linkage point are disposed forwardly of apertures in the lower linkage point.

4. Earth-working equipment comprising a pair of laterally-spaced mounting plates each having a horizontal fixing face for securing said plates to a support frame and a forward edge, an earth-working tool having two ends, a forward and a rearward edge, and a tool point, mounting means for mounting one end of said earth-working tool between said mounting plates and comprising alternative mounting hole positions in one of said earth-working tool and said mounting plates, and further mounting holes in the other of said earth-working tool and said mounting plates such that said forward edge of said earth-working tool is set facing in a forward position as determined by the forward edge of said mounting plates when one of said alternative mounting hole positions is chosen and said earth-working tool is reversed, front to rear, in between said mounting plates when the other of said alternative mounting hole positions is chosen, the forward and rearward edges of said earth-working tool being generally parallel, the equipment also comprising an earth-working tool blade having a top end and a bottom end and each edge carrying a mounting for said tool blade, whereby said tool blade may be mounted adjacent either edge and extend generally parallel to the tool edge rearwardly or forwardly from top to bottom in the respectively normal and reversed mounting positions of said earth-working tool, and attachment means at the other end of said earth-working tool securing the tool point thereto in alternative positions relative to the earth-working tool with the tool point extending forwardly and downwardly from the bottom end of said tool blade at generally the same angle to the horizontal in both the respectively normal and reversed mounting positions of said earth-working tool.

5. Earth-working equipment according to claim 4, wherein said attachment means incorporates alternative attachment hole positions in one of said earth-working tool and said attachment means for alternative mounting of said tool point in association with further attachment holes in the other of said earth-working tool and said attachment means, with said tool point extending forwardly and downwardly from the bottom end of said tool blade at generally the same angle to the horizontal in both the respectively normal and reversed mounting positions of said earth-working tool.

* * * * *